E. G. BRIGHTFUL.
NUT LOCK.
APPLICATION FILED MAY 15, 1908.
928,845.
Patented July 20, 1909.
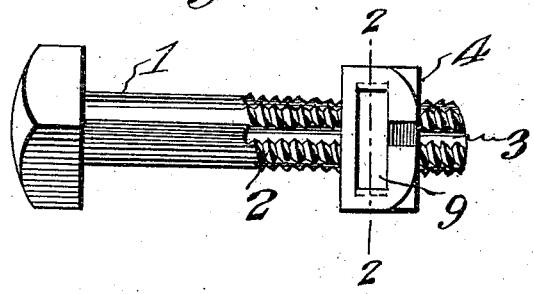
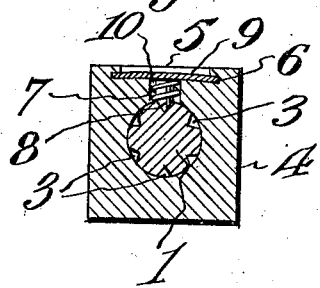 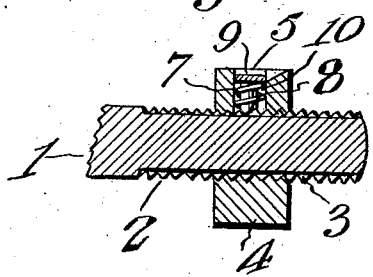
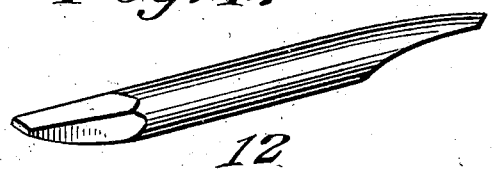
Witnesses:
Joe. P. Wahler
K. Allen
Inventor,
Ernest G. Brightful.
By Victor J. Evans.
Attorney

UNITED STATES PATENT OFFICE.

ERNEST G. BRIGHTFUL, OF PITTSBURG, PENNSYLVANIA.

NUT-LOCK.

No. 928,845.  Specification of Letters Patent.  Patented July 20, 1909.

Application filed May 15, 1908. Serial No. 433,039.

*To all whom it may concern:*

Be it known that I, ERNEST G. BRIGHTFUL, a citizen of the United States, residing at Pittsburg, in the county of Allegheny and State of Pennsylvania, have invented new and useful Improvements in Nut-Locks, of which the following is a specification.

This invention relates to nut locks, and has for its object to produce a comparatively simple, inexpensive device of this character in which the nut may be readily applied to and removed from a bolt, one wherein the nut will be securely locked in applied position upon the bolt, and one in which the nut may be quickly and easily released for removal.

With these and other objects in view the invention resides in the novel construction and arrangement of elements hereinafter fully described and claimed.

In the accompanying drawings, Figure 1 is a side elevation of a bolt and nut provided with the nut locking means embodying the invention. Fig. 2 is a transverse sectional view upon the line 2—2 of Fig. 1. Fig. 3 is a partially longitudinal sectional view of the bolt and nut. Fig. 4 is a perspective view of the implement employed for removing the locking dog from the nut to disconnect the latter from the bolt.

In the accompanying drawing the numeral 1 designates a bolt having its threaded portion 2 provided with longitudinally extending grooves or recesses 3.

The numeral 4 designates the nut. This nut 4 is provided with the usual threaded bore adapted for engagement with the threads 2 of the bolt 1. The nut has one of its faces provided with a pocket 5, and the horizontal wall provided by this pocket is extended longitudinally beneath the vertical faces of the end walls to provide recesses 6. The wall or floor of the pocket is also provided with a centrally arranged cut away portion communicating with the bore of the nut 4, and the nut is also provided with a preferably centrally arranged inclined cut away portion extending from the outer face of the nut to the central cut away portion 7. The portion 7 is preferably of an annular formation and is adapted for the reception of a dog 8 which is loosely positioned therein. The dog 8 has its lower face corresponding with the walls provided by the groove 3 of the bolt. The pocket 5 is adapted for the reception of a flat spring element 9 which occupies the recesses 6 provided by the pocket and is adapted to lie normally above the upper face of the dog 8. A helical spring 10 is secured to the lower portion of the dog 8 and is adapted to surround the same and to contact with the spring element 9, thus serving as an additional means for forcing the dog into engagement with one of the grooves 3 of the bolt and at the same time having a tendency to force the central portion of the plate slightly above the lower wall provided by the inclined cut away portion communicating with the bore 7 whereby the instrument 12, illustrated in Fig. 4 of the drawing may be readily inserted beneath the flat spring member 9 to withdraw the same from the recesses 6.

Having thus fully described the invention what is claimed as new is:

The combination with a bolt having longitudinal grooves, a nut for the bolt, said nut being provided with a pocket having its horizontal wall extending beneath the vertical walls at the ends of the pocket and being provided with an annular cut away portion communicating with the bore of the nut, the nut being also provided with an inclined cut away portion extending from its outer face to the annular cut away portion, a dog loosely positioned within the annular cut away portion and adapted to engage one of the longitudinal grooves of the bolt, a helical spring connected to the lower portion of the dog, a flat spring member adapted to have its ends engage the walls of the pocket and to normally contact the upper convolution of the helical spring of the dog.

In testimony whereof I affix my signature in presence of two witnesses.

ERNEST G. BRIGHTFUL.

Witnesses:
VASCOY T. JONES,
ALBERT G. SOMMERVILLE.